United States Patent

Ward et al.

Patent Number: 5,468,793
Date of Patent: Nov. 21, 1995

[54] PLASTIC COMPOSITIONS WITH ANTISTATIC PROPERTIES

[75] Inventors: James J. Ward, Collierville; William P. Chatham, Memphis, both of Tenn.

[73] Assignee: Wico Corporation, Greenwich, Conn.

[21] Appl. No.: 279,810

[22] Filed: Jul. 25, 1994

[51] Int. Cl.⁶ .............................. C08K 5/17; C08K 5/42
[52] U.S. Cl. .......................... 524/159; 524/236; 524/158
[58] Field of Search .................................. 524/159, 158, 524/322, 236; 525/329.5, 329.8, 329.9, 330.3, 330.4, 330.5, 374, 376, 351, 353

[56] References Cited

U.S. PATENT DOCUMENTS 4,904,825  2/1990  Govindan .................................. 562/84

Primary Examiner—Jeffrey T. Smith
Attorney, Agent, or Firm—Brooks Haidt Haffner & Delahunty

[57] ABSTRACT

Methods for reducing or eliminating static electric charges on resins by adding to the resins an effective amount of at least one substituted ammonium salt of an alkylbenzene sulfonic acid, the salt having the formula:

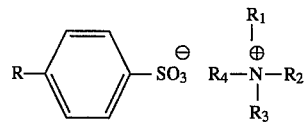

wherein R is a straight or branched chain alkyl group having from 10 to 14 carbon atoms, $R_1$ is hydroxyethyl or an alkyl group having from one to six carbon atoms, $R_2$ and $R_3$ are the same or different and are hydroxyethyl, an alkyl group having from one to six carbon atoms, or hydrogen, and $R_4$ is hydrogen or an alkyl group having from one to six carbon atoms, together with resins so produced and compositions additionally containing fatty acids for such use.

6 Claims, No Drawings

PLASTIC COMPOSITIONS WITH ANTISTATIC PROPERTIES

BACKGROUND OF THE INVENTION

The present invention relates to methods for reducing and/or eliminating static electric charges on resins, and particularly acrylic resins, by adding certain long-chain alkyl benzene sulfonic acid salts of polysubstituted ammonium compounds, together with antistatic resins containing such sulfonic salts and compositions for such use.

Acrylic polymers find wide commercial use. Their desirable qualities include crystal clarity, good surface hardness, relatively good resistance to scratches, good chemical resistance, and excellent weatherability. They can be readily formed and machined to provide a variety of shapes and are suited for such applications as automotive instrument panel covers, automotive tail lights, paneling, safety glazing, medical applications, sanitary and laboratory wear, aircraft canopies and domes, signage, and the like.

Like many polymers, the acrylics are relatively nonconductive. This can result in problems with static electric buildup and the discharge thereof. There are several aspects to this problem. For example, the sparks which occur in discharging the static charge can act as ignition sources for dusts and vapors with severe safety consequences. Aside from safety considerations, a static electric charge can also attract small particulate material which interferes with the smooth surface appearance of the acrylic and may also decrease its transparency. In the latter case, the need repeatedly to wipe the surface will increase the tendency for the surface to become scratched.

In electrical terms, a material may be considered to be a conductor or an insulator. Conductors have the ability to transmit a stream of electrons and thus carry an electrical current. When insulators are rubbed together, the surface may gain or lose electrons to become negatively or positively charged. Since the material is an insulator, it can not easily dissipate the static charge. It is this static charge which can discharge through spark formation and causes shocks to personnel or fire hazards.

Antistatic agents are materials which are added to plastics to reduce their tendency to acquire electrostatic charge. The antistatic agents are usually either hydrophilic or ionic in nature. When present on the surface of a plastic item, they facilitate the transfer of electrons and thus eliminate the buildup of static electricity.

Antistatic agents have been applied to the plastics in two ways. In the first method which is called an external antistat, the antistatic material, either neat or in solution, is applied to the plastic surface. This method is easily carried out by spraying or dipping. Any type of antistatic material may be used. The major deficiency of this treatment system is that the antistatic agent is easily removed from the plastic surface by rubbing with a cloth or cleaning solution or rinsing with water.

The second type of antistatic agent is called an internal antistat. These materials are added to the plastic before processing. During the processing steps antistatic agent migrates to the surface of the film or molded part. This thin surface layer of antistatic agent imparts antistatic behavior to the plastic surface. If the plastic surface is cleaned and the antistatic layer is removed, more antistatic agent will migrate from the interior of the plastic to the surface and restore the antistatic effect. In this manner an internal antistat produces the antistatic effect for a much longer time.

There are a number of considerations with an internal antistat. The antistatic material must have very good thermal stability to withstand the high processing temperatures required for the plastic. It must not cause color formation or discoloration in the plastic, or adversely affect the physical properties of the plastic. The antistatic agent should also not detract from the appearance of the plastic item. Finally, the antistatic agent must have the proper compatibility with the plastic. If the antistatic agent is totally incompatible with the plastic, the antistat will detract from the appearance or physical properties of the plastic. For example, a clear plastic would become opaque if it contained an incompatible antistatic agent. The ideal antistat would have limited compatibility (or solubility) in the plastic. Only a few materials will have this correct balance of compatibility in any given plastic.

There have been a number of approaches in the prior art for reducing the static charge on acrylic polymers. Sugiura et al U.S. Pat. No. 4,943,380 shows an antistatic composition containing 90–99.9 wt % of polycarbonate or polymethyl methacrylate and 0.1–10 wt % of a heat-resistant phosphonium sulfonate having the formula: A-$SO_3(-)$ $R_1$—(+)P(—$R_2$)(—$R_3$)—$R_4$, wherein A is an alkyl group with 1–36 carbon atoms, alkenyl group with 4–24 carbon atoms, phenyl group, phenyl group substituted by alkyl group with 1–18 carbon atoms, naphthyl group or naphthyl group substituted by an alkyl group with 1–18 carbon atoms; $R_1$, $R_2$ and $R_3$ are identical, each being an aliphatic hydrocarbon group with 1–8 carbon atoms or an aromatic hydrocarbon group; and $R_4$ is a hydrocarbon group with 1–18 carbon atoms.

Govindan U.S. Pat. Nos. 4,973,616 and 5,011,937 show toluene sulfonate salts of 2-alkylimidazolines, e.g., 2-undecyl-4,4,5,5-tetramethylimidazoline. These compounds are said to be useful as internal or external antistatic agents for fibers, e.g., acrylic fibers, and synthetic polymers, e.g., polystyrene.

It is of course desirable that antistatic materials for use with polyacylic materials be heat stable during processing, effective at low levels, inexpensive, and easy to blend with the resin.

THE INVENTION

Briefly, it has been discovered according to the present invention that relatively small quantities of certain substituted ammonium salts of long-chain alkylbenzene sulfonic acid can be used as a surface treatment or, more desirably, incorporated into acrylic resins to confer antistatic properties to the resin. In general, the substituted ammonium salts of the long-chain alkyl benzenesulfonic acids have the general formula:

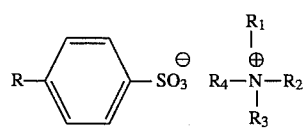

wherein R is a straight or branched chain alkyl group having from 10 to 14 carbon atoms, $R_1$ is hydroxyethyl or an alkyl group having from one to six carbon atoms, $R_2$ and $R_3$ are the same or different and are hydroxyethyl, an alkyl group having from one to six carbon atoms, or hydrogen, and $R_4$ is hydrogen or an alkyl group having from one to six carbon atoms. As taught hereinafter, the ammonium salts of the present invention can also be used in conjunction with long-chain fatty acids to improve ease of use. The present invention also contemplates novel resins with antistatic properties and antistatic compositions.

In certain preferred embodiments of the present invention, R, the alkyl group substituent on the benzene ring, contains 12 or 13 carbon atoms. Particularly preferred substituents for the benzene ring according to the present invention include normal dodecyl, branched chain dodecyl, and tridecyl alkyl groups. In certain embodiments of the present invention, preferred ammonium salts are monoethanolamine, triethanolamine, and lower alkylammonium salts including those having from three to five carbon atoms such as isopropylammonium and tetramethyl ammonium salts.

The quantity of substituted ammonium alkylbenzenesulfonate salt added to a resin is an amount effective to reduce or eliminate a static charge and can be varied over a range. It has been found that if too little of the antistatic substituted ammonium alkylbenzenesulfonate is added to the resin, then there still may be a tendency for a static charge to build up on the article made with the resin. Too great a quantity of the substituted ammonium alkylbenzenesulfonate salt can become uneconomical, and at some level it may begin adversely to affect other properties of the resin. It has been found in many embodiments of the invention that from 0.1 to two weight percent of the substituted ammonium alkylbenzenesulfonate salt gives good results when added to the resin. In the most preferred embodiments, the resin can contain from about 0.2 to about 1.5 percent by weight of the substituted ammonium alkylbenzene-sulfonate salt.

The substituted ammonium alkylbenzenesulfonate salts according to this invention are low-melting semisolid materials, and as such, they can be handled as a molten liquid. It is a feature of the present invention in certain preferred embodiments that the substituted ammonium alkylbenzenesulfonate salts can be mixed with a quantity of certain fatty acids to provide a solid material, which can be easier to weigh, handle, and add to the resin. Moreover, in some embodiments the addition of such fatty acids has been found to improve the antistatic-imparting characteristics of the substituted ammonium alkylbenzenesulfonate salts.

Such fatty acids include those having from 16 to 24 carbon atoms in the molecule. In certain preferred embodiments of the invention, saturated fatty acids are used, with palmitic acid, stearic acid, arachidic acid, behenic acid, and mixtures of such acids providing particularly desirable results.

The upper limit of the fatty acid or fatty acid mixture is generally dependent upon the antistatic-imparting properties of the substituted ammonium alkylbenzenesulfonate salts, and the lower quantity is that which improves the handling qualities of the substituted ammonium alkylbenzenesulfonate salts. The quantity of the fatty acid used can be varied from about 50 to about 150 weight percent of the substituted ammonium alkylbenzenesulfonate salt. In certain embodiments, it is preferred to use equal parts by weight of the substituted ammonium alkylbenzenesulfonate salt and the fatty acid or fatty acid mixture.

The acrylic polymers contemplated by the present invention are alkylacrylates. The polymers are generally prepared from lower alkyl monomers such as methyl acrylate, ethyl acrylate, and butyl acrylate. In preferred embodiments, the resins are predominantly methyl methacrylate. In some embodiments, the acrylate polymers will contain other vinyl monomers, such as vinyl esters or butadiene.

The acrylic polymers are usually prepared with a free radical catalyst. The polymerization process can be bulk, suspension, emulsion, or solution polymerization. The polymers are available in a number of physical forms including sheet, rods, tubes, pellets, and beads.

The antistatic substituted ammonium alkylbenzenesulfonate salts according to the present invention can readily be added when acrylics are processed by conventional means, including extrusion, injection molding, compression molding, or casting.

The substituted ammonium alkylbenzenesulfonate salt antistatic agent can be used as an external antistat by spraying a solution of the antistat on the surfaces of plastic parts or by dipping the resin into a solution of the substituted ammonium alkylbenzenesulfonate salt. This will impart antistatic properties to the acrylic plastic, but the effect will not be as long lasting, since any cleaning of the surface tends to remove the antistatic agent from the surface.

It is accordingly preferred to use the antistatic agents as internal antistatic agents for the acrylic polymers. This is the preferable method since the antistatic effect will be much longer-lasting. Even if the antistatic agent is removed from the surface of the polymer, more antistat will bloom or migrate from the interior of the plastic to the surface.

The antistat can be blended with the resin by conventional methods such as by mixing or by extrusion. A masterbatch technique can also be used. In the masterbatch technique, a concentrated mixture of the antistatic agent and acrylic polymer is extruded to form pellets. These pellets are then mixed with additional polymer to produce the appropriate final concentration. This mixture is melted and extruded or molded.

The acrylic polymer and antistatic agent can readily be converted into finished products by any of the known processing methods, including molding, casting, and extrusion.

The antistatic compositions of the present invention have good thermal stability, so they can be used at the typical processing temperatures for the acrylic polymers.

All parts, percentages, proportions, and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended Claims. These Examples will show the antistatic effect produced by each of the various additives when mixed into acrylic polymers.

The equipment and procedures are the same in all the Examples. The required amount of the internal antistat is mixed with Rohm and Haas V920 general molding grade acrylic resin pellets to produce a total weight of 400 grams.

This mixture is shaken in a plastic bag for three minutes to distribute the antistat in the acrylic resin. The mixture is then extruded through a twin-screw extruder at 220° C. and the strand of acrylic resin from the extruder is cut into pellets. This extrusion and pelletizing process is repeated a total of three times.

This extrusion process produces an intimate homogeneous mixture of the antistatic agent in the acrylic plastic. The pellets are compression molded at 220° C. into plaques which are seven inches on each side. The plaques are 0.075 inches thick. A sample which is three inches wide and seven inches long is cut from the plaque for testing.

The antistatic behavior of the sample is tested using the Static Decay Test (Federal Test Standards 101C Method 4046). In this test the plaque is charged to 5000 volts DC. The test is carried out for both a positive charge and a negative charge. After charging, the plaque is grounded and the time required for 90% discharge is measured. Normally, the test is somewhat dependent upon humidity, so the testing is done in a humidity-controlled chamber. In that way, the humidity can be controlled at whatever level is desired. These tests are run at 15, 70 and 90% humidity.

The test humidity is indicated in the Examples. Normally, antistatic agents are more effective at high humidities. As the antistatic effect improves, the discharge time decreases. Thus, a lower time is indicative of greater antistatic effect. Polymers which contain no antistatic agent often will not even accept the initial 5000-volt charge.

EXAMPLE 1

The following compositions are prepared and tested, and the results are as shown in the tabulation.

| Antistatic Agent | Concentration | Humidity | Discharge Time (seconds) |
|---|---|---|---|
| Triethanolammonium linear dodecylbenzene-sulfonate salt | 1.0% | 70% | 0.35 |
| Triethanolammonium linear dodecylbenzene-sulfonate salt | 1.5% | 70% | 0.3 |
| Triethanolammonium linear dodecylbenzene-sulfonate salt | 0.5% | 90% | 3.0 |
| Triethanolammonium linear dodecylbenzene-sulfonate salt | 1.0% | 90% | 0.23 |
| Triethanolammonium linear dodecylbenzene-sulfonate salt | 1.5% | 90% | 0.08 |
| Monoethanolammonium linear dodecylbenzene sulfonate salt | 0.5% | 80% | 0.2 |
| Monoethanolammonium linear dodecylbenzene sulfonate salt | 1.0% | 80% | 0.02 |
| Monoethanolammonium linear dodecylbenzene sulfonate salt | 1.5% | 80% | 0.02 |
| None | NA | 80% | Will not charge |

The foregoing tabulation indicates that monoethanolamine and triethanolamine salts of dodecylbenzene sulfonic acid are excellent internal antistatic agents for acrylic plastics.

EXAMPLE 2

Further samples are tested to show the effect of the alkyl group R of the substituted ammonium alkylbenzenesulfonate salt. The results are shown in the following tabulation:

| Antistatic Agent | Concentration | Humidity | Discharge Time (seconds) |
|---|---|---|---|
| Triethanolammonium branched dodecylbenzene sulfonate salt | 0.75% | 70% | 1.5 |
| Triethanolammonium branched dodecylbenzene sulfonate salt | 1.5% | 70% | 0.2 |
| Monoethanolammonium tridecylbenzenesulfonate salt | 0.5% | 70% | 2.0 |
| Monoethanolammonium tridecylbenzenesulfonate salt | 1.0% | 70% | 1.2 |
| Monoethanolammonium tridecylbenzenesulfonate salt | 1.0% | 90% | 0.8 |
| Monoethanolammonium linear dodecylbenzene sulfonate salt | 0.25% | 70% | 8 |
| Monoethanolammonium linear dodecylbenzene sulfonate salt | 0.375% | 70% | 5 |
| Monoethanolammonium linear dodecylbenzene sulfonate salt | 0.5% | 70% | 1 |
| Monoethanolammonium linear dodecylbenzene sulfonate salt | 0.75% | 70% | 0.2 |
| Monoethanolammonium linear dodecylbenzene sulfonate salt | 2.0% | 70% | 0.05 |
| None | NA | 70% | Will not charge |

The foregoing tabulation demonstrates that the alkyl substituent on the benzenesulfonic acid can be linear dodecyl, branched dodecyl, or linear tridecyl with excellent results.

EXAMPLE 3

Further tests are performed with various derivatives as follows:

| Antistatic Agent | Concentration | Humidity | Discharge Time (seconds) |
|---|---|---|---|
| Isopropylammonium linear dodecylbenzene-sulfonate salt | 1.5% | 90% | 4 |
| None | NA | 90% | Will not charge |

This test demonstrates the effectiveness of a salt of an aliphatic amine and dodecylbenzenesulfonic acid as an antistatic agent for acrylic polymers.

EXAMPLE 4

A further series of tests is run with fatty acid mixtures with the following results:

| Antistatic Agent | Concentration | Humidity | Discharge Time (seconds) |
|---|---|---|---|
| 50% Monoethanol-ammonium dodecylbenzenesulfonate 50% Hystrene 7018 (stearic acid) | 0.75% | 16% | 9 |
| 50% Monoethanol-ammonium dodecylbenzenesulfonate 50% Hystrene 7018 (stearic acid) | 1.0% | 16% | 0.9 |
| 50% Monoethanol-ammonium dodecylbenzenesulfonate 50% Hystrene 7018 (stearic acid) | 1.25% | 16% | 0.5 |
| 50% Monoethanol- | 1.5% | 16% | 0.3 |

-continued

| Antistatic Agent | Concentration | Humidity | Discharge Time (seconds) |
|---|---|---|---|
| ammonium dodecylbenzenesulfonate 50% Hystrene 7018 (stearic acid) | | | |
| None | NA | 16% | Will not charge |

The data show the effectiveness of mixtures of the ammonium dodecylbenzenesulfonate salts (as described in previous Examples) and a fatty carboxylic acid. In this series the mixtures are 50% by weight of the sulfonate salt and 50% by weight of stearic acid. The fatty acid can be any chain length from 16 carbon atoms to 24 carbon atoms, as well as mixtures of these acids.

EXAMPLE 5

Tetrabutyl phosphonium dodecylbenzenesulfonate (as described in Sugiura U.S. Pat. No. 4,943,380) is tested as an antistatic agent as follows:

| Antistatic Agent | Concentration | Humidity | Discharge Time (seconds) |
|---|---|---|---|
| Tetrabutylphosphonium dodecylbenzenesulfonate | 0.5% | 70% | Will not charge |
| Tetrabutylphosphonium dodecylbenzenesulfonate | 0.75% | 70% | Will not charge |
| Tetrabutylphosphonium dodecylbenzenesulfonate | 1.0% | 70% | Will not charge |

This Example demonstrates that the prior art tetrabutylphosphonium dodecylbenzenesulfonate salts shown in Sugiura are not effective as internal antistatic agents in acrylic polymers.

EXAMPLE 6

Tetramethyl dodecylbenzenesulfonate according to the present invention is tested as an antistatic agent in acrylic polymers. The results are as follows:

| Antistatic Agent | Concentration | Humidity | Discharge Time (seconds) |
|---|---|---|---|
| 50% Monoethanol-ammonium dodecylbenzenesulfonate 50% Hystrene 7018 (stearic acid) | 1% | 50% | 3 |
| 50% Monoethanol-ammonium dodecylbenzenesulfonate 50% Hystrene 7018 (stearic acid) | 1.5% | 50% | 0.1 |
| 50% Monoethanol-ammonium dodecylbenzenesulfonate 50% Hystrene 7018 (stearic acid) | 2% | 50% | 0.04 |
| 50% Monoethanol-ammonium dodecylbenzenesulfonate 50% Hystrene 7018 (stearic acid) | 3% | 50% | 0.01 |
| None | NA | 50% | Will not charge |

This Example demonstrates that a tetraalkylammonium salt is effective as an internal antistatic agent for acrylic polymers. It will be appreciated from the present disclosure that other lower tetraalkylammonium alkylbenzenesulfonate salts as described can also be used with good results.

What is claimed is:

1. A method for reducing the tendency of acrylic resins to acquire a static electric charge which method comprises adding to the resin an effective amount of at least one substituted ammonium salt of a long-chain alkylbenzene sulfonic acid and a fatty acid, the salt having the formula:

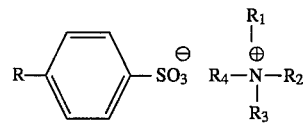

wherein R is a straight or branched chain alkyl group having from 10 to 14 carbon atoms, $R_1$ is hydroxyethyl or an alkyl group having from one to six carbon atoms, $R_2$ and $R_3$ are the same or different and are hydroxyethyl, an alkyl group having from one to six carbon atoms, or hydrogen, and $R_4$ is hydrogen or an alkyl group having from one to six carbon atoms and the fatty acid having from 16 to 24 carbon atoms.

2. A method according to claim 1 wherein the substituted ammonium alkylbenzenesulfonate salt is incorporated into the resin.

3. A method according to claim 1 wherein R is straight chain dodecyl, branched chain dodecyl, or tridecyl.

4. A method according to claim 1 wherein $R_1$ is hydroxyethyl and $R_2$, $R_3$, and $R_4$ are hydrogen; $R_1$, $R_2$, and $R_3$ are hydroxyethyl and $R_4$ is hydrogen; $R_1$ is alkyl and $R_2$, $R_3$, and $R_4$ are hydrogen; or $R_1$, $R_2$, $R_3$, and $R_4$ are methyl.

5. A method according to claim 1 wherein the fatty acid is added in an amount of from 50 to 150 weight percent of the substituted ammonium alkylbenzenesulfonate salt.

6. A method according to claim 1 wherein the fatty acid is added in an amount of about 100 percent of the weight of the salt.

* * * * *